Nov. 2, 1954

A. B. EASTWOOD 2,693,057

CUTOFF MACHINE

Filed March 30, 1954

INVENTOR.
ABRAHAM B. EASTWOOD
BY
ATTORNEY

Nov. 2, 1954

A. B. EASTWOOD 2,693,057

CUTOFF MACHINE

Filed March 30, 1954

INVENTOR.
ABRAHAM B. EASTWOOD
BY
ATTORNEY

Nov. 2, 1954  A. B. EASTWOOD  2,693,057
CUTOFF MACHINE
Filed March 30, 1954  6 Sheets-Sheet 5

INVENTOR.
ABRAHAM B. EASTWOOD
BY
ATTORNEY

Nov. 2, 1954  A. B. EASTWOOD  2,693,057
CUTOFF MACHINE

Filed March 30, 1954  6 Sheets-Sheet 6

INVENTOR.
ABRAHAM B. EASTWOOD
BY
*Leo Edelson*
ATTORNEY

United States Patent Office 2,693,057
Patented Nov. 2, 1954

2,693,057

CUTOFF MACHINE

Abraham B. Eastwood, Abington, Pa., assignor to Tabor Manufacturing Company, Philadelphia, Pa., a corporation of Pennsylvania Application March 30, 1954, Serial No. 419,778

15 Claims. (Cl. 51—98)

This invention relates generally to cutoff machines and more particularly is concerned with an improved construction of the type wherein the cutoff member is automatically lowered to and through the work underlying the same.

A principal object of the present invention is to provide such a machine with means for projecting a beam of light over the cutoff member and operable to move downwardly relative to the cutoff member so that the beam of light is interrupted by the cutoff member as the latter approaches a predetermined position preliminarily to engaging the underlying work.

Another object of the present invention is to provide such a machine with means responsive to interruption of the beam of light as aforementioned to change the rate of movement downward of the cutoff member, and wherein such change occurs as the bottom of the cutoff member approaches a predetermined position preliminarily to engaging the underlying work irrespective of change in the diameter of the cutoff member due to wear.

And still another object of the present invention is to provide such a machine with a pair of cutoff members which may be positioned in side by side relation close enough for all practical purposes, as for simultaneously making a pair of closely spaced cuts.

Other objects and advantages of the present invention will appear more fully hereinafter, it being understood that the invention consists substantially in the combination, construction, location and general arrangement of parts, all as described in detail in the following specification, as shown in the accompanying drawing and as fully pointed out in the appended claims.

Referring to the drawings, the cutoff machine of the present invention essentially comprises a pair of head assemblies 10 and 11 mounted on an understructure 12 and disposed in laterally spaced relation to one another. The construction and operation of head assembly 10 will be described, and it will be understood that the construction and operation of head assembly 11 is similar to that of head assembly 10, albeit the assembly 11 is assembled to the opposite hand.

The head assembly 10 includes a principal frame 13 which extends fore and aft of the machine and which is provided with a top wall 14 and integral depending sidewalls 15—15. The principal frame 13 carries a circular cutoff member which is revoluble about a horizontal axis. For mounting the cutoff member, the opposite end portions of a spindle 16 are journalled respectively in opposed front end portions of the principal frame sidewalls 15—15. The circular cutoff member is in the form of an abrasive wheel 17 mounted on the terminal portion of the spindle 16 which is proximate the principal frame 11. A pulley 18 is mounted on the other terminal portion of the spindle 16, and, for rotating, as a unit the pulley 18, spindle 16 and abrasive wheel 17, an electric motor 19 is mounted on the principal frame 13 and is connected to the pulley 18 through the medium of a motor pulley 20 and belts 21.

Figure 1:
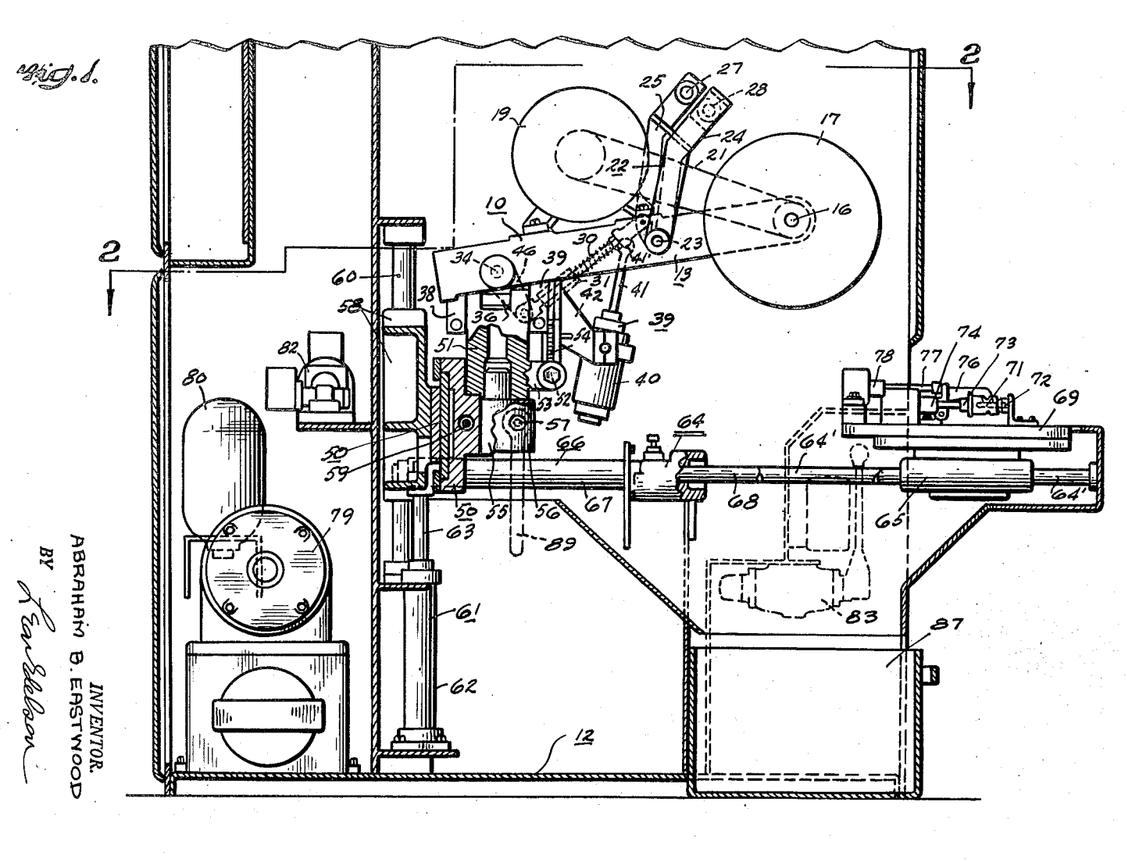
Figure 1 is a vertical longitudinal section through a machine embodying the present invention, the head assembly being shown in fully raised position and the work table in loading position.

The principal frame 13 also carries an auxiliary frame 22 swingable about a horizontal axis. The auxiliary frame 22 includes a shaft 23 the terminal portions of which respectively mount a pair of arms 24 and 25 extending laterally therefrom in the same direction. For mounting the auxiliary frame 22, the opposite end portions of the shaft 23 are journalled respectively in opposed intermediate portions of the principal frame sidewalls 15—15. Referring particularly to Figure 1, when the auxiliary frame 22 is mounted as aforementioned, the arms 24 and 25 extend upwardly from the shaft 23 and are disposed respectively on opposite sides of the principal frame 13, the abrasive wheel 17 being disposed intermediate the principal frame 13 and the arm 24, as viewed from the front of the machine. The free end portion of the arm 24 mounts a mirror 26, and the corresponding end portion of the arm 25 mounts a light source 27 and a photoelectric cell 28, the beam of light 29 from the light source 27 being directed upon the mirror 26 and from the latter back to the photoelectric cell 28.

For securing the auxiliary frame in the aforementioned upright position, there is provided a link 30 one end portion of which is connected to an intermediate portion of the arm 24 for swinging movement of the link 30 about a horizontal axis. When connected as aforementioned, the link 30 extends rearwardly and downwardly from its connection with the arm 24. The link 30 is arranged for initial adjustment of its effective length, which may be effected by turning a nut 31. In addition, the link 30 is arranged for relative axial shifting movement (during operation of the machine) of its component parts against the force of a coil spring 32 for reducing the effective length of the link 30 and against the force of another coil spring (not shown) within the nut 31 for increasing the effective length of the link 30.

The principal frame 13 is mounted upon the understructure 12 through the medium of trunnion means including a first trunnion shaft 34 the opposite end portions of which are journalled respectively in opposed rear end portions of the principal frame sidewalls 15—15 for swinging movement of the principal frame 13 about a horizontal axis. The trunnion shaft 34 is carried by a trunnion head piece 35 which is mounted upon a second trunnion shaft 36 for swinging movement about a horizontal axis. The head 35 is provided with a barrel 37 through which the trunnion shaft 34 projects, and is further provided with a pair of integral arms 38—38 through which the trunnion shaft 36 projects, the latter shaft being thereby positioned under the trunnion shaft 34 and normal thereto.

Referring particularly to Figure 1, when the principal frame 13 is mounted as aforementioned, it extends forwardly and upwardly from the trunnion shaft 34 and is secured against swinging movement about the axis of trunnion shaft 34 by a fluid pressure motor 39 which comprises a cylinder 40 and a double acting piston 41, the latter being connected, as at 41' to the underside of the principal frame 13 for swinging movement of the fluid pressure motor 39 about a horizontal axis. When connected as aforementioned, the fluid pressure motor 39 extends rearwardly and downwardly from its connection with the principal frame 13, being carried by a bracket 42 having a base 43 and a pair of integral arms 44—44. Through the medium of its base 43, the bracket 42 is mounted on the shaft 36 and secured to the head 35 for movement therewith about the axis of the shaft 36. The arms 44—44 extend forwardly from the base 43 in spaced relation, and the cylinder 40 is disposed therebetween, being provided with a pair of axially alined trunnions 45—45 respectively journalled in arms 44—44 for swinging movement of the fluid pressure motor 39 about a horizontal axis.

For carrying the rear end of the link 30, there is provided an arm 46 through one end portion of which there projects the trunnion shaft 34. The opposite end portion of the arm 46 is provided with a laterally extending pintle 47, and the arm 46 is positioned between the associated sidewall 15 and the barrel 37 of the head 35 so that the pintle 47 extends under the aforementioned sidewall 15 and projects through the lower end portion of the link 30. The barrel 37 of the head 35 is provided with a pair of integral lugs 48—48, and the arm 46 is provided with an integral lug 49, the aforementioned lugs being interengaged to lock the arm 46 to the head 35 so as to prevent relative movement about the axis of the trunnion shaft 34. When thus locked to the head 35, the arm 46 extends forwardly and downwardly from the trunnion shaft 34.

The understructure 12 comprises a rigid casing and mechanism for suitably carrying the head assemblies 10 and 11. The construction and operation of the mechanism for the head assembly 10, designated generally by the numeral 50, will be described, and it will be understood that the construction and operation of the mechanism for the head assembly 11 is similar to that for the head assembly 10, albeit that for the assembly 11 is assembled to the opposed hand.

The mechanism 50 includes a trunnion post member 51 disposed in upright position under the head 35. The upper end portion of the post 51 is received between the arms 38—38 of the head 35, and the trunnion shaft 36 projects therethrough for movement of the head 35 about the axis of the shaft 36. The lower end portion of the post 51 carries a worm 52 the opposite end portions of which are journalled respectively in a pair of ears 53—53 formed integral with the post 51. For securing the head 35 against the aforementioned movement about the axis of the shaft 36, a worm gear sector 54 is secured to the base 43 of the bracket 42 and the teeth of the gear sector 54 are suitably engaged with the thread of the worm 52. The lower end portion of the post 51 is suitably fitted with a pintle 55 which depends therefrom in longitudinal continuation of the post 51 and projects into a trunnion support member 56 for movement of the post 51 and the pintle 55 about their central axis. For securing the post 51 and the pintle 55 against the aforementioned movement, the part of the support 56 which receives the pintle 55 is fitted with a bolt 57 which extends transversely of the pintle and is milled or otherwise shaped to provide a portion which may be wedged against the pintle when the bolt is axially shifted, as by a clamping lever 89.

The support 56 is carried by a cross head 58 which is provided with a horizontal slide upon which the support 56 may be shifted through the medium of a screw 59, the opposite end portions of the latter being suitably engaged respectively with the support 56 and the cross head 58. The latter is slidably mounted upon a pair of laterally spaced upright posts 60—60 for vertical shifting movement through the medium of a fluid pressure motor 61 which is disposed in an upright position under the cross head 58. The fluid pressure motor 61 includes a cylinder 62 and a double acting piston 63 suitably connected to the cross head 58.

The understructure 12 also includes mechanism for suitably holding the work which is to be cut by the head assemblies 10 and 11. This mechanism, designated generally by the numeral 64, includes a pair of laterally spaced rigid horizontal bars 64'—64' upon which there is mounted a carriage 65 shiftable fore and aft of the machine through the medium of a fluid pressure motor 66 which has a cylinder 67 and a double acting piston 68, the latter being suitably connected to the carriage 65. A work table 69 is mounted upon the carriage 65 for movement therewith, both the table 69 and the carriage 65 being provided with an opening, as at 70, over which the work 71 is positioned through the medium of clamping means. The clamping means includes a set of three clamps a pair of which each comprises a claim part 72 and a coacting pneumatically actuated ram 73 working in a cylinder 74. The third clamp comprises a pair of clamp parts 75—75 and a coacting hold-down arm 76 pivotally mounted and secured in clamping position by a pneumatically actuatable ram 77 working in cylinder 78.

Figure 4:
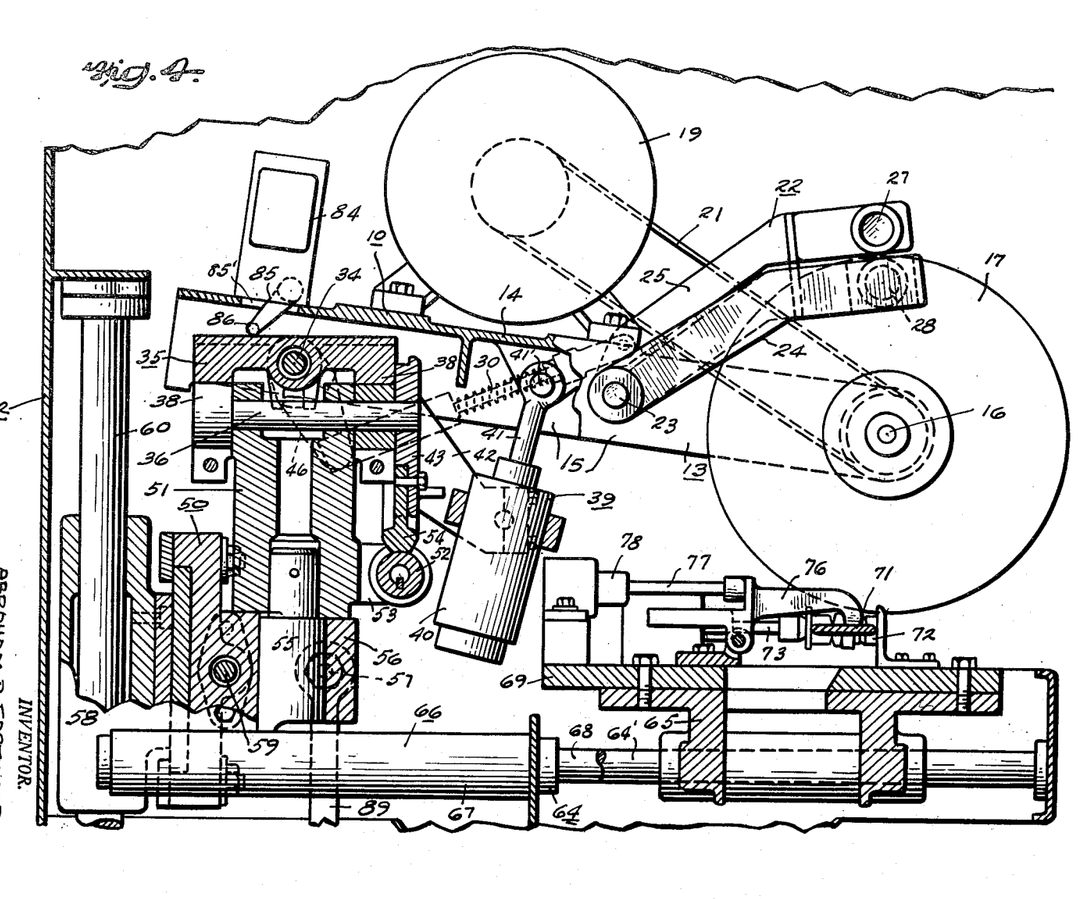
Figure 4 is an enlarged vertically longitudinal section taken generally along the line 4—4 of Figure 2, the head assembly being shown in lowered position preliminarily to engaging the work, and the work table being shown in cutting position.

The fluid pressure motors 39—39, 61—61 and 66 are connected in hydraulic circuit with a pump unit 79, an accumulator 80 and suitable valves, of which latter the valves 81 and 82 are shown. Valve means actuable by the operator, of which the valves 83 are shown, are provided for controlling the operation of the fluid pressure motors 61—61 and 66. Furthermore, there is provided a system in which a pair of limit switches 84—84 and solenoids controlling certain of the valves are connected in electric circuit with means actuable by the operator for initiating automatic operation of the fluid pressure motors 39—39. Referring particularly to Figure 4, the limit switch 84 is carried by the principal frame 13, being mounted on the top wall 14 of the principal frame 13, and being provided with an arm 85 which depends therefrom and projects through an opening 85' formed in the top wall 14. The upper end portion of the arm 85 is mounted for swinging movement of the arm 85 about a horizontal axis, and the lower end portion of the arm 85 is provided with a roller 86 mounted for rotation about a horizontal axis. The roller 86 engages the top of the underlying head 35, and when the roller 86 is thus engaged, the arm 85 extends rearwardly and downwardly from its pivotal axis.

Figure 2:
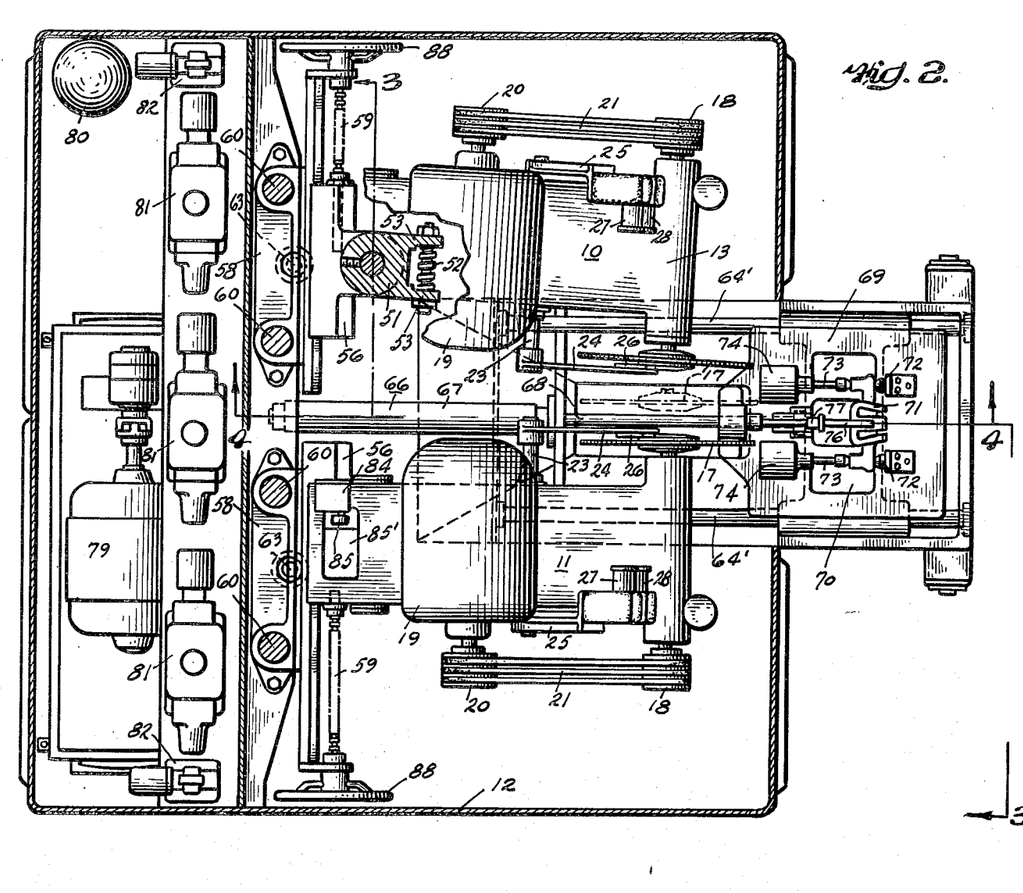
Figure 2 is a horizontal section taken on line 2—2 of Figure 1.

In the operation of the cutoff machine, the work 71 is secured in the desired position on the table 69 through the medium of the set of three clamps described hereinbefore. This is effected while the carriage 65 and the table 69 are in the loading position shown in Figures 1 and 2. Then the piston 68 of the fluid pressure motor 66 is retracted, whereupon the carriage 65 and the table 69 are shifted rearwardly on the bars 64'—64' to a selected cutting position under the abrasive wheels 17—17, as indicated in Figure 4. After the work has been cut, the pneumatically actuated rams 73—73 and 77 are retracted, whereupon the work is released and the pieces thereof drop through the opening 70 and into containers 87. Then the piston 68 of the fluid pressure motor 66 is again extended so as to shift the carriage 65 and table 69 forwardly to loading position for receiving the next piece of work to be cut.

Figure 3:
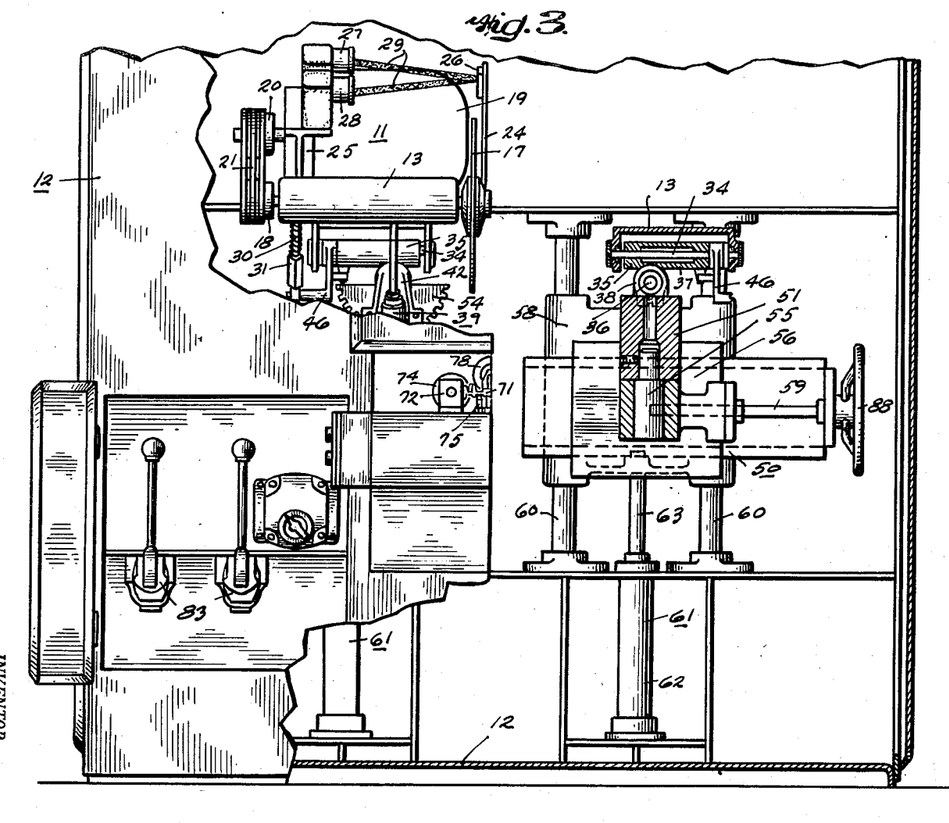
Figure 3 is partly a front elevation and partly a vertical transverse section taken generally along the line 3—3 of Figure 2.
Figure 6:
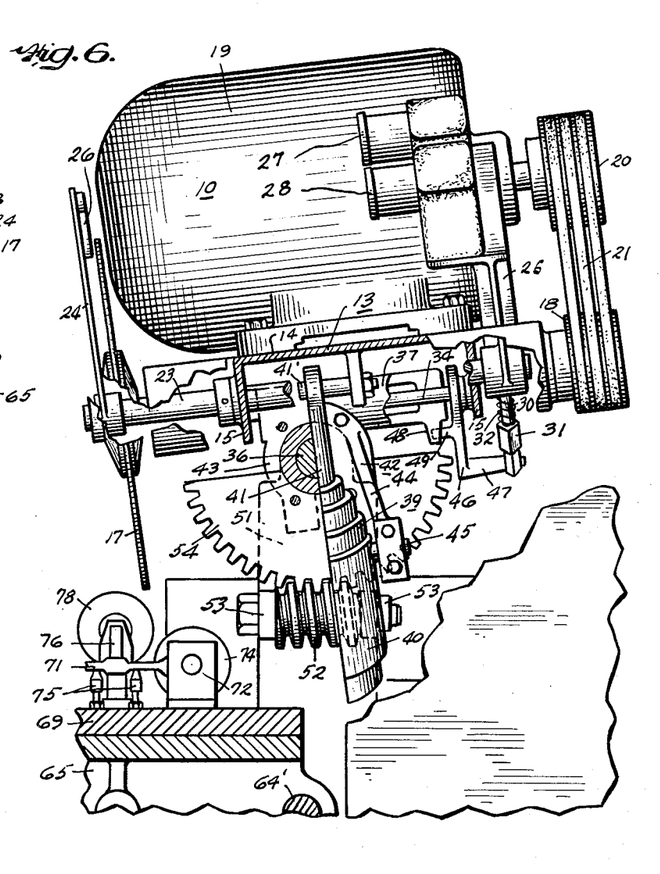
Figure 6 is a front elevation of the head assembly tilted to one side.

The head assemblies 10 and 11 are positionable each as a unit independently of the other. Referring particularly to Figure 1, by actuating the piston 63 of the fluid pressure motor 61, the cross head 58 can be shifted vertically on the posts 60—60, whereupon the head assembly 10 is raised or lowered. In addition, referring particularly to Figures 2 and 3, by turning a handwheel 88 and the screw 59, the support 56 may be shifted horizontally on the slide associated with the cross head 58, whereupon the head assembly is moved toward one side or the other of the machine. Furthermore, referring particularly to Figure 1, by suitably shifting the bolt 57, as by the lever 89, the pintle 55 may be released and then the head assembly 10 may be swung about the central axis of the post 51 and pintle 55 toward one side or the other of the machine. Still further, referring particularly to Figure 6, by turning the worm 52, utilizing any suitable means, the worm gear sector 54 may be rocked about the axis of the trunnion shaft 36, whereupon the head assembly 10 is tilted to one side or the other of the machine.

Figure 5:
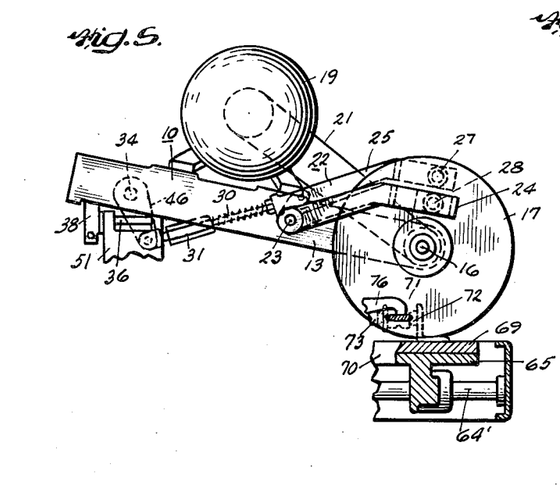
Figure 5 is a side elevation of the head assembly showing the same in fully lowered position.

In addition to head assemblies 10 and 11 being positionable each as a unit as just described, the principal and auxiliary frames of the head assemblies 10 and 11 are positionable each independently of the other. Referring particularly to Figure 1, by actuation of the piston 41 of the fluid pressure motor 39, the principal frame 13 may be swung about the axis of the trunnion shaft 34 from the fully raised position shown in Figure 1 to the lowered position shown in Figure 5 and then back again to the fully raised position. Suitable means is provided for selectively controlling the maximum stroke of the piston 41 and for selectively positioning the upper limit of its movement so as to predetermine the angular relation of the principal frame 13 to a horizontal plane when the same is fully raised. In addition, by turning the nut 31 of the link 30, the effective length of the link 30 may be varied, whereupon the auxiliary frame 22 swings about its pivotal axis so as to position the arms 24 and 25 in a selected angular relation to the principal frame 13.

Figure 7:
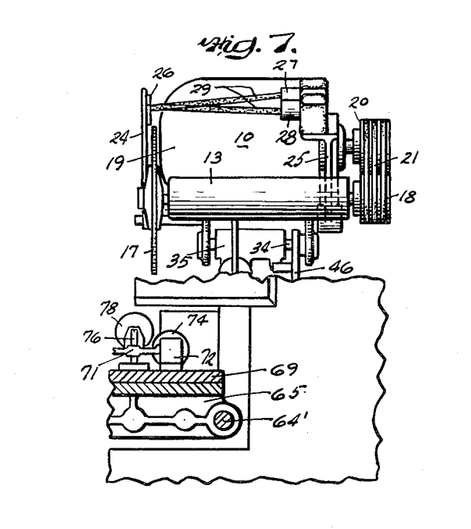
Figure 7 is a front elevation of the head assembly showing the same in fully raised position and the beam of light projected across the cutoff member.

In the condition of the machine shown in Figure 1, the desired positioning of the head unit 10 and of its principal and auxiliary frames as described hereinbefore has been effected, the work 71 is clamped to the table 69, which is in loading position, and the abrasive wheel 17 is being rotated through the medium of the motor 19, belts 21 and spindle 16. The table 69 may now be shifted to the cutting position indicated in Figure 4. Then the operator initiates actuation of the fluid motor 39, whereupon the piston 41 is automatically retracted and then extended again to its initial position. During retraction of the piston 41, the principal frame 13 and abrasive wheel 17 swing downwardly, the latter being lowered a distance sufficient for cutting through the work 71. When the principal frame 13 swings downwardly, the pivotal axis of the auxiliary frame 22 and that of the connection between the link 30 and the auxiliary frame 22 swing downwardly respectively along intersecting arcuate paths so that the angular change in the position of the auxiliary frame exceeds that of the principal frame and so that the photoelectric cell 28, light source 27 and mirror 26 carried by the auxiliary frame 22 are lowered at a rate which is approximately double that at which the abrasive wheel 17 is lowered. It will be evident, therefore, that as the principal and auxiliary frames approach the underlying work 71, the photoelectric cell 28, light source 27 and mirror 26 carried by the auxiliary frame 22 additionally approach the abrasive wheel 17 carried by the principal frame 13. During initial downward swinging movement of the principal and auxiliary frames, the beam of light 29 which is directed upon the mirror 26 by the light source 27 and reflected by the mirror 26 back to the photoelectric cell 28 is uninterrupted, as shown in Figure 7. Continued downward swinging movement of the principal and auxiliary frames causes the slower moving abrasive wheel 17 to interrupt the beam of light 29, as shown in Figures 8 and 9.

The photoelectric cell 28 is connected in electric circuit with means for throttling the fluid pressure motor 39 for a predetermined period of time, as a consequence of which the abrasive wheel 17 is initially lowered at a desired rate until the beam of light 29 is interrupted as aforementioned, whereupon the fluid pressure motor 39 is throttled, the abrasive wheel 17 being thereafter lowered at a diminished predetermined rate. At the end of the selected period of time, when the abrasive wheel 17 has completed its work, the fluid pressure motor 39 is unthrottled, as a consequence of which the abrasive wheel 17 is raised at the higher rate to its initial position. It should be noted here that the position of the abrasive wheel 17 when its rate of movement downwardly changes may be varied by changing the effective length of the link 30.

During movement of the principal frame 13, the roller 86 carried by the arm 85 of the limit switch 84 moves over the head 35 in contact therewith, as a consequence of which the arm 85 is rocked about its pivotal axis so that as the abrasive wheel 17 approaches its fully raised position, the limit switch 84 is opened, whereupon the automatic operation of the fluid pressure motor 39 is terminated.

Figure 8:
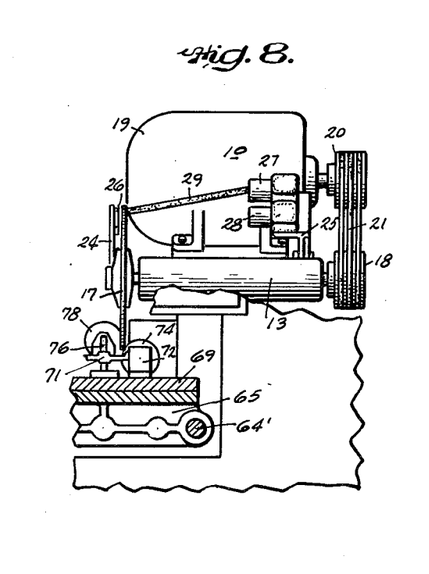
Figure 8 is similar to Figure 7 but shows the head assembly lowered, the bottom of the cutoff member at a predetermined position preliminarily to engaging the work and the beam of light interrupted by the cutoff member.
Figure 9:
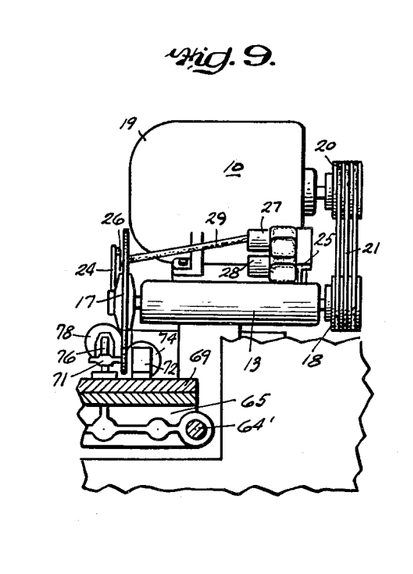
Figure 9 is similar to Figures 7 and 8 but shows the head assembly lowered still farther, the bottom of the cutoff member at a predetermined position after cutting through the work and the beam of light still interrupted by the cutoff member.

It will be observed that after the beam of light 29 is interrupted, as shown in Figure 8, the auxiliary frame 22 continues to swing downwardly to the lowered position shown in Figure 9. At the same time, as indicated hereinbefore, the ratio of the rate at which the abrasive wheel 17 is lowered to the rate at which the photoelectric cell 28, light source 27 and mirror 26 are lowered is approximately 1 to 2. Consequently, the abrasive wheel 17 always interrupts the beam of light 29 when the bottom of the wheel is a predetermined distance above the table 69 irrespective of changes in the diameter of the wheel due to wear. To illustrate, assume that the diameter of the abrasive wheel 17 is twelve inches, and that due to wear it will eventually be ten inches. Also assume that each time a piece of work is cut, the bottom of the wheel must be lowered to a distance of four inches above the table 69. In this event, the central axis of the wheel will be lowered to a distance of ten inches above the table 69 before the wheel is worn and nine inches after the wheel is worn—a difference of one inch. Correspondingly, the top of the wheel will be lowered to a distance of 16 inches above the table 69 before the wheel is worn and 14 inches after the wheel is worn—a difference of two inches. The ratio of the aforementioned differences is 1 to 2, as a consequence of which the beam of light 29 is interrupted when the bottom of the wheel is a distance of four inches above the table 69, whether or not the wheel is worn.

It will be observed that the head assemblies 10 and 11 may readily be positioned so that their abrasive wheels 17—17 are spaced apart a distance sufficient only to accommodate the arms 24—24. This feature is important because the work often requires closely spaced cuts, and economy of operation requires that such cuts be made simultaneously whenever it is possible to do so.

It will be understood, of course, that the apparatus hereinabove shown and described is susceptible of various changes and modifications which may be made from time to time without any departure from the general principles or real spirit of the invention. For example, the mirror 26 as such might be dispensed with, and instead the arm 24 might be provided with a polished surface portion which could serve the same purpose. In addition, the mirror 26 might be dispensed with altogether, and the light source 27 and photoelectric cell 28 might be mounted respectively on the arms of the auxiliary frame 22. Accordingly, it is intended to claim the present invention broadly, as well as specifically, as indicated in the appended claims.

What is claimed as new and useful is:

1. In a cutoff machine of the character described, an assembly comprising a circular cutoff member rotatable about a generally horizontal axis, means supporting said cutoff member and operable to automatically lower said cutoff member a distance sufficient for cutting through the work underlying the same and to then raise said cutoff member, and means directing a beam of light over said cutoff member and operable to move downwardly relative to said cutoff member so that the beam of light is interrupted by said cutoff member as the latter approaches a predetermined position preliminarily to engaging the underlying work, said automatic means being responsive to interruption of the beam of light as aforesaid for diminishing the rate of movement downwardly of said cutoff member.

2. In a cutoff machine of the character described, an assembly comprising a principal frame swingable about a generally horizontal axis, an abrasive wheel carried by said principal frame for swinging movement therewith and mounted for rotation about a generally horizontal axis, means supporting said principal frame and abrasive wheel and operable to automatically swing the same downwardly a distance sufficient for lowering said abrasive wheel for cutting through work underlying the same and to then swing said principal frame and abrasive wheel upwardly to the initial positions thereof, an auxiliary frame pivotally mounted on said principal frame for swinging movement about a generally horizontal axis, a photoelectric cell, a light source, said photoelectric cell and light source being carried by said auxiliary frame and being mounted to project a beam of light over said abrasive wheel from said light source to said photoelectric cell, and linkage associated with said auxiliary frame and operable to swing said auxiliary frame, photoelectric cell and light source downwardly relative to said abrasive wheel at such a rate that the beam of light is interrupted by said abrasive wheel as the latter approaches a predetermined position preliminarily to engaging the underlying work, said automatic means being responsive to interruption of the beam of light as aforesaid for diminishing the rate of movement downwardly of said abrasive wheel.

3. In a cutoff machine of the character described, an assembly comprising a principal frame swingable about a generally horizontal axis, an abrasive wheel carried by said principal frame for swinging movement therewith and mounted for rotation about a generally horizontal axis, means supporting said principal frame and abrasive wheel and operable to automatically swing the same downwardly a distance sufficient for lowering said abrasive wheel for cutting through work underlying the same and to then swing said principal frame and abrasive wheel upwardly to the initial positions thereof, an auxiliary frame pivotally mounted on said principal frame for swinging movement about a generally horizontal axis, a photoelectric cell, a light source, said photoelectric cell and light source being carried by said auxiliary frame and being mounted to project a beam of light over said abrasive wheel from said light source to said photoelectric cell, and linkage associated with said auxiliary frame and operable to swing said auxiliary frame, photoelectric cell and light source downwardly, said photoelectric cell and light source being lowered at a rate which is approximately double that at which said abrasive wheel is lowered so that the beam of light is interrupted by said abrasive wheel as the latter approaches a predetermined position preliminarily to engaging the underlying work, said automatic means being responsive to interruption of the beam of light as aforesaid for diminishing the rate of movement downwardly of said abrasive wheel.

4. In a cutoff machine of the character described, an assembly comprising trunnion means, a principal frame mounted on said trunnion means for swinging movement about a horizontal axis, an abrasive wheel carried by said principal frame for swinging movement therewith and mounted for rotation about a horizontal axis disposed in spaced parallel relation to the axis of said trunnion means, means supporting said principal frame and abrasive wheel and operable to automatically swing the same downwardly a distance sufficient to lower said abrasive wheel for cutting through work underlying the same and to then swing said principal frame and abrasive wheel upwardly to the initial positions thereof, an auxiliary frame pivotally mounted on said principal frame for swinging movement about a horizontal axis disposed intermediate the aforesaid horizontal parallel axes of said trunnion means and abrasive wheel, a photoelectric cell, a light source, said photoelectric cell and light source being carried by said auxiliary frame and being mounted to project a beam of light over said abrasive wheel from said light source to said photoelectric cell, and linkage associated with said auxiliary frame and operable to swing said auxiliary frame, photoelectric cell and light source downwardly, said photoelectric cell and light source being lowered at a rate which is approximately double that at which said abrasive wheel is lowered so that the beam of light is interrupted by said abrasive wheel as the latter approaches a predetermined position preliminarily to engaging the underlying work, said automatic means being responsive to interruption of the beam of light as aforesaid for diminishing the rate of movement downwardly of said abrasive wheel.

5. In a cutoff machine as defined in claim 4 wherein the auxiliary frame comprises a pair of arms disposed respectively on opposite sides of the principal frame, one of said arms being provided with a light reflecting surface portion presenting toward the other arm, the photoelectric cell and light source being carried by said other arm and being mounted to project a beam of light from said light source over the abrasive wheel to said light reflecting surface portion and from the latter back over said abrasive wheel to said photoelectric cell.

6. In a cutoff machine as defined in claim 4 wherein the auxiliary frame comprises a pair of arms disposed respectively on opposite sides of the principal frame, the abrasive wheel is positioned on one side of the principal frame laterally intermediate the same and the one of said arms disposed on the same side of the principal frame, the latter arm being provided with a light reflecting surface portion presenting towards the other arm, the photoelectric cell and light source being carried by said other arm and being mounted to project a beam of light from said light source over the abrasive wheel to said light reflecting surface portion and from the latter back over said abrasive wheel to said photoelectric cell.

7. In a cutoff machine as defined in claim 4 wherein the linkage includes a link which is adjustable for varying its effective length and thereby effecting a selected angular relation between said principal and auxiliary frames.

8. In a cutoff machine as defined in claim 4 wherein the linkage includes a link one end portion of which is secured for pivotal movement of said link about an axis which is positionally fixed in spaced underlying relation to the pivotal axis of the principal frame and the opposite end portion of which is connected with said auxiliary frame for pivotal movement of said link about an axis which is disposed in spaced overlying relation to the pivotal axis of said auxiliary frame, the pivotal axes of said auxiliary frame and of the connection of said link with said auxiliary frame being operable to swing downwardly respectively along intersecting arcuate paths so that angular change in the position of said auxiliary frame exceeds that of said principal frame.

9. In a cutoff machine as defined in claim 4 wherein the automatic means comprises an upright member carried by the trunnion means and mounted beneath the principal frame for axial shifting movement, said upright member having a selectively positionable limit of shifting movement which predetermines the angular relation of said principal frame to a horizontal plane when the same is fully raised.

10. In a cutoff machine as defined in claim 4 wherein the automatic means comprises a fluid pressure motor including a cylinder, and a double acting piston the maximum stroke of which may be varied, said cylinder and piston being connected respectively to the trunnion means and principal frame for pivotal movement of said fluid pressure motor about horizontal axes, and said piston having a selectively positionable limit of axial shifting movement which predetermines the angular relation of said principal frame to a horizontal plane when the same is fully raised.

11. In a cutoff machine of the character described, an assembly comprising trunnion means, a principal frame mounted on said trunnion means for swinging movement about a horizontal axis, an abrasive wheel carried by said principal frame for swinging movement therewith and mounted for rotation about a horizontal axis, means supporting said principal frame and abrasive wheel and operable to automatically swing the same downwardly a distance sufficient to lower said abrasive wheel for cutting through work underlying the same and to then swing said principal frame and abrasive wheel upwardly to the initial positions thereof, a limit switch carried by said principal frame and maintained by said trunnion means in closed condition, said limit switch being operable to open and then reclose during said automatic swinging movement of the principal frame and abrasive wheel, the later being terminated upon said reclosing of the limit switch, an auxiliary frame pivotally mounted on said principal frame for swinging movement about a horizontal axis, a photoelectric cell, a light source, said photoelectric cell and light source being carried by said auxiliary frame and being mounted to project a beam of light over said abrasive wheel from said light source to said photoelectric cell, and linkage associated with said auxiliary frame and operable to swing said auxiliary frame, photoelectric cell and light source downwardly, said photoelectric cell and light source being lowered downwardly relative to said abrasive wheel at such a rate that the beam of light is interrupted by said abrasive wheel as the later approaches a predetermined position preliminarily to engaging the underlying work, said automatic means being responsive to interruption of the beam of light as aforesaid for diminishing the rate of movement downwardly of said abrasive wheel.

12. In a cutoff machine as defined in claim 2 wherein the assembly is one of two opposite hand assemblies disposed in laterally spaced relation to one another and mutually independent in operation, the abrasive wheels respectively of said assemblies are positioned intermediate the principal frames, the auxiliary frames each comprise a pair of arms disposed respectively on opposite sides of the associated principal frame, the light reflecting surface portion being associated with one arm, and the photoelectric cell and light source being associated with the other arm and being mounted to project a beam of light over the associated abrasive wheel from said light source to said light reflecting surface portion and from the latter back over said abrasive wheel to said photoelectric cell, and the light reflecting arms respectively of said auxiliary frames are positioned intermediate said abrasive wheels in close adjacent relation to one another.

13. In a cutoff machine of the character described, an assembly comprising a rotatable circular cutoff member, means supporting said cutoff member and operable to automatically shift said cutoff member in one direction a distance sufficient for cutting through the work and to then shift said cutoff member in the opposite direction, and means directing a beam of light across said cutoff member, the last mentioned means being shiftable relative to said cutoff member so that the beam of light is interrupted by said cutoff member as the latter approaches a predetermined position preliminarily to engaging the work, said automatic means being responsive to interruption of the beam of light as aforesaid for changing the rate of shifting movement of said cutoff member.

14. In a cutoff machine of the character described, an assembly comprising a principal frame swingable about a generally horizontal axis, an abrasive wheel carried by said principal frame for swinging movement therewith and mounted for rotation about a generally horizontal axis, means supporting said principal frame and abrasive wheel and operable to automatically swing the same a distance sufficient for said abrasive wheel to cut through the work and to then swing said principal frame and abrasive wheel back to the initial positions thereof, an auxiliary frame pivotally mounted on said principal frame for swinging movement about a generally horizontal axis, a photoelectric cell, a light source, said photoelectric cell and light source being carried by said auxiliary frame and being mounted to project a beam of light across said abrasive wheel from said light source to said photoelectric cell, and linkage associated with said auxiliary frame, and operable to swing said auxiliary frame, photoelectric cell and light source relative to said abrasive wheel at such a rate that the beam of light in interrupted by said abrasive wheel as the latter approaches a predetermined position preliminarily to engaging the work, said automatic means being responsive to interruption of the beam of light as aforesaid for diminishing the rate of movement of said abrasive wheel.

15. In a cutoff machine of the character described, an assembly comprising a principal frame swingable about a generally horizontal axis, an abrasive wheel carried by said principal frame for swinging movement therewith and mounted for rotation about a generally horizontal axis, means supporting said principal frame and abrasive wheel and operable to automatically swing the same downwardly a distance sufficient for lowering said abrasive wheel for cutting through work underlying the same and to then swing said principal frame and abrasive wheel upwardly to the initial positions thereof, an auxiliary frame pivotally mounted on said principal frame for swinging movement about a generally horizontal axis, a photoelectric cell, a light source, said photoelectric cell and light source being carried by said auxiliary frame and being mounted to project a beam of light across said abrasive wheel from said light source to said photoelectric cell, and linkage associated with said auxiliary frame and operable to swing said auxiliary frame, photoelectric cell and light source relative to said principal frame and abrasive wheel, said photoelectric cell and light source being moved at a rate which is approximately double that at which said abrasive wheel is lowered so that the beam of light is interrupted by said abrasive wheel as the latter approaches a predetermined position preliminarily to engaging the underlying work, said automatic means being responsive to interruption of the beam of light as aforesaid for diminishing the rate of movement downwardly of said abrasive wheel.

No references cited.